May 3, 1955   J. R. STANDRING   2,707,694
METHOD OF ADHESIVELY JOINING METAL, WOOD AND PLASTIC PARTS
Filed Oct. 19, 1950   2 Sheets-Sheet 1
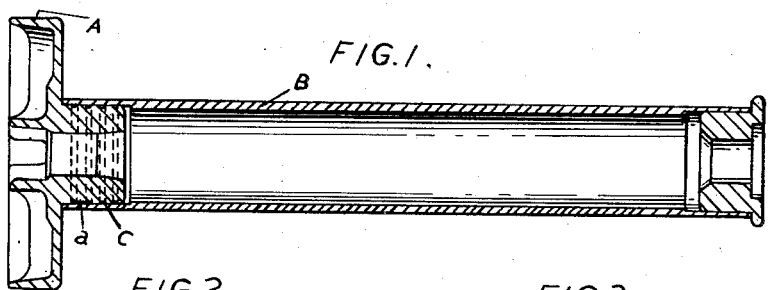
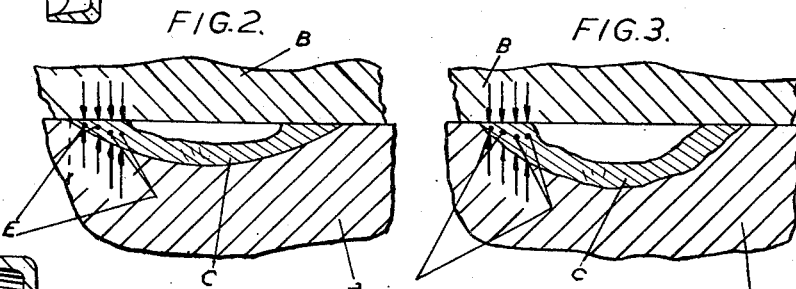
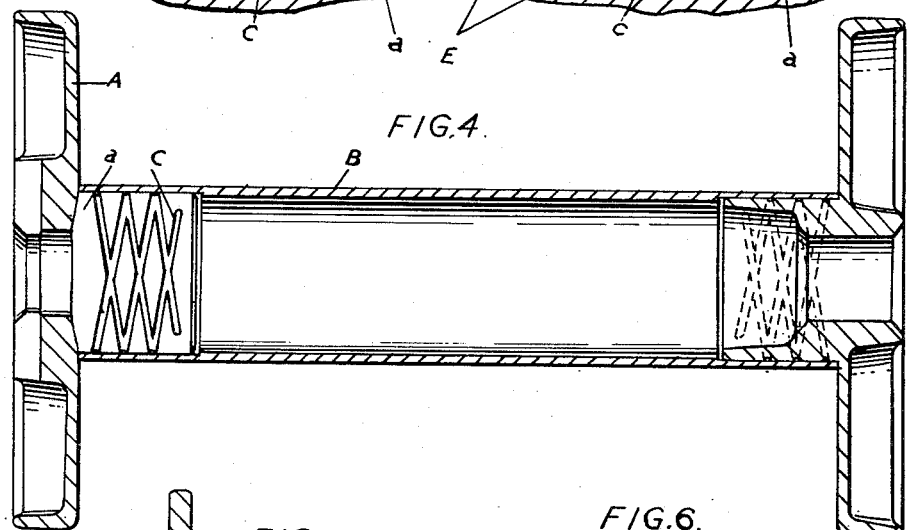
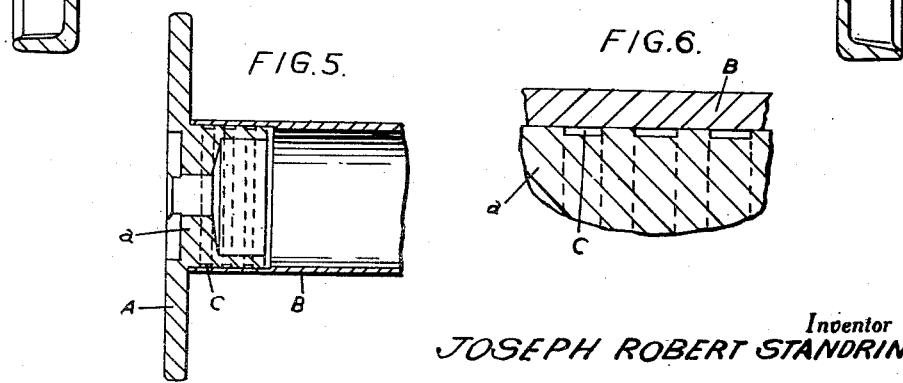
Inventor
JOSEPH ROBERT STANDRING,
by John B. Brady
Attorney

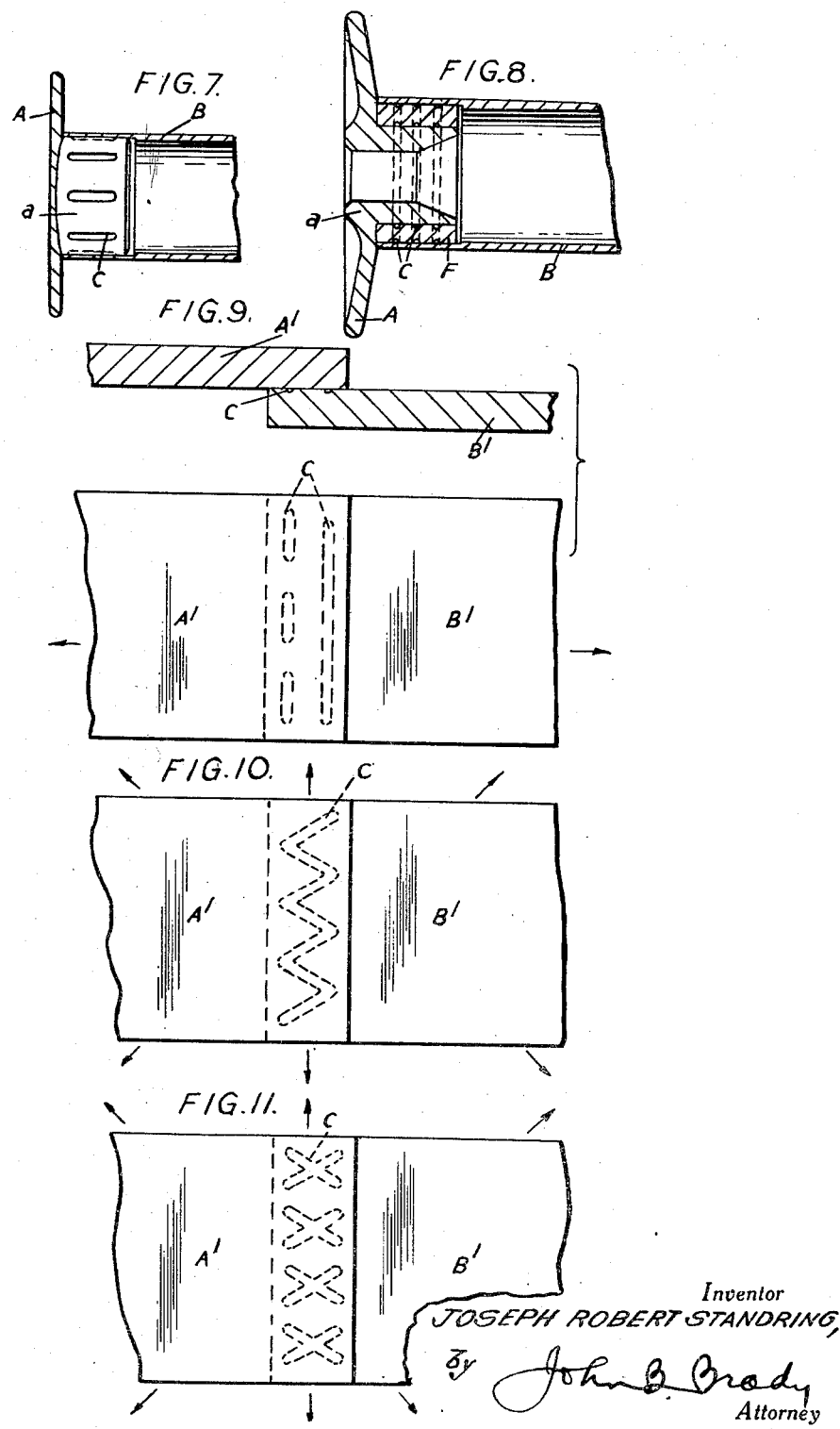

United States Patent Office 2,707,694
Patented May 3, 1955

2,707,694

METHOD OF ADHESIVELY JOINING METAL, WOOD AND PLASTIC PARTS

Joseph Robert Standring, Bushey Heath, England

Application October 19, 1950, Serial No. 190,933

4 Claims. (Cl. 154—81)

This invention relates to the permanent and rigid joining together of contacting or mating parts. More especially, the invention is applicable to the joining together of the hubs or tubes with the end flanges, or bobbins, beams, spools and the like (hereinafter referred to simply as bobbins) as employed for the drawing, spinning, weaving, carrying and winding of textile yarns, extruded wire, rubber and synthetic filaments and other materials, but it may be useful for accomplishing the permanent and rigid assembly of the component parts of divers articles of metal, wood and plastic materials or combinations of such materials.

The invention provides a method of permanently and rigidly joining together two contacting or mating parts with the aid of an adhesive containing as part of its composition a solvent or liquid vehicle or other medium which, when heated, will generate a gaseous pressure, characterized in that grooves (or equivalent) are formed in at least one of the parts within the contact area to carry the adhesive and in that after assembly of the parts, heat is applied to vaporize the solvent or vehicle or medium of the adhesive sealed in the reservoirs formed by the grooves thereby creating a gaseous pressure which forces the adhesive beyond the confines of the grooves into the interstices between the contact surfaces.

From experiment and research I have established that the strength of a joint made in accordance with the invention is governed inter alia by the relative area of the adhesive bond and by control of the thickness of the adhesive layer. I have also established that in the case of thermo-setting and thermo-plastic adhesives, pressure is required at the time of bonding to prevent the development in the adhesive of porosity with consequent loss of bonded area and relative loss of strength.

The grooves provided within the confines of the areas to be bonded contain pools of adhesive used, and in the assembled condition these pools of adhesive are mechanically sealed along their edges or periphery by the ruling areas of the contacted or mated parts.

Thermo-plastic and thermo-setting adhesive materials such as that disclosed by British Patent Specification 583,148 require heat in order to remove the volatile solvent present and/or effect the curing process, and to complete the polymerization of the adhesive.

On the application of heat to the assembled parts the liquid vehicle or solvent of such an adhesive is vaporized thus producing a positive pressure, as is required, which forces the adhesive beyond the confines of the individual grooves into the interstices of the contacting or mating surfaces.

The grooves may have various cross sectional shapes and may be formed in one or in both of the surfaces to be joined; they may be machined or pre-cast or otherwise formed in such a manner that the cross section near the edges must provide a thickness of adhesive within dimensions having the most suitable cross sectional shear value of the adhesive. The maximum depth and the frequency of the grooves may be varied in order to determine the number of shear edges resisting separation of the bonded areas or the value of the vapor pressure exerted on the adhesive pools during the application of heat subsequent to assembly of the contacted or mated parts.

The bonding of metals and other materials in sheet or strip form by means of adhesives under the application of heat and pressure coincidentally are well known.

The present invention when applied to tubular joints substitutes the desirable but practically unattainable mechanical pressure during bonding by vapor pressure by vaporizing the solvent content from the pools of adhesive occupying the grooves within the bonding area at the time of heating or curing the adhesive.

The method of bonding according to the invention may also be applied to strip, sheet or relatively flat surfaces by the provision of grooves within the adhesively bonded area which grooves after the application of heat and pressure will afford edge boundaries of adhesive layers having sectional depths which provide ideal shear stress resisting values. These grooves may also be arranged on the bonded surfaces directionally to resist operational shear stress values without close dimensional control of the grooves.

Representative examples of the many possible applications of the invention are illustrated by Figures 1 to 11 of the accompanying drawing and will now be described.

The same references are employed throughout to denote the same or similar parts. In general A and B are two parts to be joined, and C are the grooves provided in at least one of the two parts for the purpose herein set forth.

Fig. 1 is a longitudinal sectional view of a high-speed spinning bobbin in which, in its loaded condition—i. e. when carrying threads wound thereon under tension, is subjected to high tensional stresses tending to force the flange A from the core or tube B. Four circular grooves C are shown in the hub $a$ of the flange A for the adhesive bonding of the said hub and the said tube, which are a press fit so as to obtain a close material fit on both sides of each groove.

Under the effect of heat, after the application of adhesive to the grooves C and assembly of the parts A and B, the vaporizable content of the small and sealed pools of adhesive in the grooves is vaporized and, due to the sealing, produces a positive pressure which forces the adhesive beyond the confines of the grooves into the interstices of the contacted or mated surfaces, so that in fact there is obtained an extraordinary strong joint by the combination of a close material contact of the two parts and adhesive bonding within the confines of that contact.

Fig. 2 is an enlarged sectional view of one of the four grooves C, showing the residual adhesive D after the aforesaid vaporization. The varying increments of bonding depth resisting tensional shear are represented by the distances between the pairs of opposing arrows and are indicated generally by the reference E. Among these will be one ideal depth of adhesive that offers maximum resistance to the shear stress tending to separate the flange A from tube B. In this instance the grooves are machined grooves each of arcuate cross section.

Fig. 3 shows an alternative in which each groove is cast, without machining; it offers the same physical characteristics as the machined groove of Fig. 2.

Fig. 4 is a longitudinal sectional view of a high speed textile bobbin with another arrangement of the grooves C. The relatively heavy mass of yarn on such a bobbin produces, during the process of spinning and winding, high torsional stresses as well as high tensile stresses between the tube B and each flange A. In this instance the grooves C are machined or cast in the surface of the hub $a$ of each flange A in the form of a double helix, whereby the adhesive in the grooves will offer resistance to both linear and torsional shear stresses.

When the depth of the particular adhesive used that offers maximum shear resistance is known, or has been ascertained from experiment, the grooves C may be machined to this depth as shown in Figs. 5 and 6. Fig. 5 is a fragmentary axial section of a wire or textile yarn carrying bobbin, and Fig. 6 an enlarged view of the joint between the hub of the flange A and the tube B. In this instance the grooves C are rectangular in cross section and their radial depth equals the depth of the adhesive that offers maximum shear resistance.

Figure 7 is a fragmentary axial section of a wire winding and carrying bobbin with the grooves C arranged parallel to the axis of the tube B so that the adhesive in the grooves will withstand high torsional shear stress loadings between the flange A and the tube B.

Fig. 8 is an application of the invention where a bush F is interposed between the hub $a$ of the flange A and the tube B of a bobbin, in order to provide against a high electrode potential between say a magnesium flange and an aluminium alloy tube; or where a rubber, plastic, or synthetic joint is required in order to damp out the effects of vibration in operation. The bush F has grooves C for the adhesive in both its inner and outer surfaces and makes good material contact, outside the grooves, with the hub $a$ of the flange A on the one hand and with the tube B on the other. As in all the previous examples the application of heat to the assembled parts, after the grooves have been charged with adhesive, produces a positive pressure due to evaporation of the liquid vehicle or solvent of the sealed-in adhesive, which forces the adhesive beyond the confines of the individual grooves C into the interstices of the contacting or mating surfaces.

Figs. 9, 10 and 11 show applications of the invention to the joining of two sheets A' and B'. In Fig. 9, the adhesive containing grooves C are parallel to the overlapped edges of the sheets, whereby the adhesive in the grooves offers maximum resistance to tensional stresses at right angles to those edges. In Fig. 10 the grooves C are zig-zag in order that the adhesive in the same will offer good resistance in both lateral and diagonal directions. Fig. 11 shows for the last mentioned purpose another arrangement of the grooves C, namely a crossed arrangement.

With further reference to Figs. 9 to 11 it is to be understood that after the grooves C have been charged with adhesive, the two sheets A' and B' are brought into close material contact under pressure and heat, whereupon the adhesive will be forced beyond the confines of the grooves C into the interstices of the contacting or mating surfaces.

Although for convenience of description reference is made herein to grooves it will be understood that other forms of depressions may be employed.

In effecting the joint according to my invention, no dimensional change of the mating parts takes place, and the predetermined shape of both mating parts is fully retained. The joint effected in accordance with my invention does not depend upon any change of form in the two mating parts, to secure a permanent anchorage. One of the important considerations is that the grooves C are of such size and depth and are so displaced from the edges of the mating parts that the quantity of adhesive that may be forced from the grooves will not extend beyond the peripheral limits of the overlapping parts to be joined. That is to say, some of the adhesive is retained in the grooves while a small quantity of the adhesive is forced into the interstices of the contacting or mating surfaces for effecting the joint, but in no instance is the quantity of adhesive which is forced from the grooves sufficient to extend beyond the limits of the overlapping part to be joined. The grooves constitute reservoirs which are charged with adhesive material and the contents of these grooves are dispersed by gaseous pressure and forced between the areas to be bonded while retaining a percentage of the adhesive in the grooves so that the joint may be of maximum rigidity and permanency.

While I have described my invention in certain of its preferred embodiments, I realize that modifications may be made, and no limitations upon my invention are intended except as may be imposed by the scope of the appended claims.

I claim:

1. A method of permanently and rigidly joining together two parts in direct contact with one another which comprises the steps, in combination, of making depressions for adhesive in the contact surface of at least one of said parts in positions disposed wholly within the boundary of contact of both parts and extending in a substantially lateral plane with respect to the axis of said parts and displaced from the peripheral edges thereof for distances greater than the flow path of adhesive which may be contained in said depressions, charging said depressions with an adhesive capable when heated of liberating a gas, bringing said parts into direct surface contact whereby said depressions constitute sealed reservoirs containing said adhesive, and applying heat to liberate gas under pressure from said adhesive in said sealed reservoirs, the pressure displacing some of said adhesive into the surface interstices of the neighboring areas of contact of said parts while the shape and dimensions of said parts are retained.

2. A method of permanently and rigidly joining to a bobbin tubular core a separate bobbin flange having a hub dimensioned to be a close fit in said core thereby to afford directly contacting surfaces between said core and said hub, which method comprises the steps, in combination, of making depressions for adhesive in at least one of said contacting surfaces in positions disposed wholly within the boundary of contact and extending in a substantially lateral plane with respect to the axis of said contacting surfaces and displaced from the peripheral edges of said contacting surfaces for distances greater than the flow path of adhesive which may be contained in said depressions, charging said depressions with a thermo-setting adhesive containing as part of its composition a heat-vaporizable medium, assembling said hub and said core together whereupon said depressions constitute sealed reservoirs containing said adhesive, and applying heat to cure said adhesive and vaporize said medium and generate gaseous pressure in said sealed reservoirs, said pressure displacing some of said adhesive into the surface interstices of the neighboring areas of contact of said core and hub for rigidly joining said core and hub while part of said adhesive is retained in said depressions.

3. A method of permanently and rigidly joining together two overlapping sheets of material with the overlap affording direct material contact, which comprises the steps, in combination, of making depressions for adhesive in at least one of the contacting surfaces in positions disposed wholly within the boundary of overlap of both sheets and extending in a generally lateral plane with respect to the axis of said sheets and displaced from the peripheral edges of said sheets for distances greater than the flow path of adhesive which may be contained in said depressions, charging said depressions with a thermo-setting adhesive containing as part of its composition a heat-vaporizable medium, assembling said sheets in overlapping surface contact relation whereupon said depressions constitute sealed reservoirs containing said adhesive, and applying heat to cure said adhesive and vaporize said medium and generate gaseous pressure in said sealed reservoirs, said pressure displacing some of said adhesive into the surface interstices of the neighbouring areas of contact of said sheets while retaining part of the adhesive in said depressions and maintaining the shape and dimensions of said sheets.

4. A method of permanently and rigidly joining together two overlapping sheets of material with the overlap affording direct material contact, which comprises the steps, in combination, of forming recesses for adhesive in at least one of the contacting surfaces in positions wholly within the boundary of overlap of both sheets extending in a substantially lateral plane with respect to the axis of said sheets, and displaced from the peripheral limits of the sheets for distances greater than the flow distance of adhesive which may be contained in said recesses, charging the recesses with a thermosetting adhesive containing as part of its composition a heat vaporizable medium, assembling said sheets in mutual overlapping contact, whereby said recesses constitute closed reservoirs containing said adhesive and applying heat to cure said adhesive and vaporize said medium and generate gaseous pressure in said recesses whereby said pressure displaces some of the adhesive into the surface interstices of the adjacent areas of contact of said sheets while retaining part of the adhesive in said recesses and maintaining the shape and dimensions of said sheets, the size and shape of said recesses and the distance of said recesses from the peripheral limits of said sheets being proportioned so that the quantity of adhesive displaceable from said recesses is restricted to an amount sufficient to unite the adjacent areas of contact of said sheets without being force-flowed beyond the peripheral limits of the adjacent areas of contact.

References Cited in the file of this patent

UNITED STATES PATENTS

| Number | Name | Date |
|---|---|---|
| 33,193 | Hale | Sept. 3, 1861 |
| 102,443 | Smith | Apr. 26, 1870 |
| 326,469 | Youngs | Sept. 15, 1885 |
| 1,019,407 | Baekeland | Mar. 5, 1912 |
| 1,656,032 | Birkholtz | Jan. 10, 1928 |
| 1,779,426 | Frederick | Oct. 28, 1930 |
| 1,859,468 | Repony | May 24, 1932 |
| 2,048,895 | Rosen | July 28, 1936 |
| 2,048,995 | Clinton | July 28, 1936 |
| 2,181,136 | Knox | Nov. 28, 1939 |
| 2,207,240 | Cornwell | July 9, 1940 |
| 2,256,272 | Batcheller | Sept. 16, 1941 |
| 2,290,205 | Nugent | July 21, 1942 |
| 2,373,744 | Coghill | Apr. 17, 1945 |
| 2,446,243 | Reynolds | Aug. 3, 1948 |
| 2,511,174 | Osborne | June 13, 1950 |
| 2,638,429 | Patterson | May 12, 1953 |

FOREIGN PATENTS

| Number | Country | Date |
|---|---|---|
| 319,416 | Great Britain | Sept. 26, 1929 |
| 655,482 | Great Britain | July 25, 1951 |